United States Patent [19]

Wolschlager

[11] 4,277,972
[45] Jul. 14, 1981

[54] ENGINE DYNAMOMETER

[75] Inventor: Gerald J. Wolschlager, Rochester, Mich.

[73] Assignee: Modular Data Systems, Inc., Utica, Mich.

[21] Appl. No.: 100,808

[22] Filed: Dec. 6, 1979

[51] Int. Cl.³ .............................................. G01L 3/20
[52] U.S. Cl. ............................................... 73/862.16
[58] Field of Search ........................... 73/134, 118

[56] References Cited

U.S. PATENT DOCUMENTS

| | | | |
|---|---|---|---|
| 4,023,405 | 5/1977 | Larson | 73/134 |
| 4,092,855 | 6/1978 | Kinney | 73/134 |
| 4,182,166 | 1/1980 | Herr | 73/134 |
| 4,199,979 | 4/1980 | Herr et al. | 73/134 |

*Primary Examiner*—Donald O. Woodiel
*Attorney, Agent, or Firm*—Cullen, Sloman, Cantor, Grauer, Scott & Rutherford

[57] ABSTRACT

A dynamometer particularly suited for rapid testing of internal combustion engines coming off an engine assembly line wherein a driving connection is established from a flexible drive plate on the engine crankshaft to the dynamometer input shaft by means of an adapter which includes a conventional friction disc sub-assembly of an automobile manual transmission clutch to absorb excessive torque pulses of the engine and a thrust bearing mounted on the dynamometer input shaft between a collar keyed to the dynamometer input shaft and the dynamometer housing, so that no axial thrust loads are applied to the dynamometer input shaft.

4 Claims, 2 Drawing Figures

ENGINE DYNAMOMETER

BACKGROUND AND SUMMARY OF INVENTION

The present invention concerns improvements in dynamometers for testing internal combustion engines. More specifically, the inventions disclosed and claimed herein arose out of a program involving design and development of a dynamometer particularly suited for running rapid automated tests of Buick V-6 engines as they come off the engine assembly line. Such a testing environment puts a premium on simple, rapid and reliable means for connecting the engine to be tested to the dynamometer unit. Both the time available for making the connections and the skill of the operator in the assembly plant environment are generally less than those which exists in a laboratory test environment. Therefore, there is a greater possibility that errors may be made in the connections which may produce conditions detrimental to the accuracy or integrity of the equipment.

As stated above, the engine for which the test system was developed is a 90 degree V-6 engine having a rated torque of approximately 300 foot pounds. The engine is suspended on a J-hook from an overhead beam during the test, and the dynamometer itself is also separately suspended. The engine and dynamometer are clamped together for testing by means of air-driven screws. The dynamometer itself is a water brake type unit manufactured by Go-Power Corporation of Palo Alto, Calif. For purposes of the present program, applicant had to develop an improved input end of the dynamometer as well as an adapter for interfacing the input of the dynamometer to the output of the tested engine.

The driving connection between the adapter and the engine is effected by means of three axially extending locating pins positioned to engage three holes located at 120 degree intervals in the engine flywheel (for use with manual transmissions) or engine-mounted flexible drive plate (for use with automatic transmissions). Thus, all that is necessary to establish a mechanical driving connection between the engine and the dynamometer is to bring the axes of these two units into substantial alignment, bring the pins of the dynamometer adapter into angular alignment with the holes in the flywheel or flexible drive plate and then bolt the two units together with two air-driven bolts.

Early experience with this unit produced several structural failures in the dynamometers. The source of the excessive or unusual loading on the dynamometer was not readily apparent, but it was ultimately traced to two phenomena.

It was discovered that one of the problems resulted from an excessive axial thrust applied from the engine toward the dynamometer, a type of loading which normally, if it exists at all in an engine, is absorbed within the engine rather than being transmitted from the engine to the dynamometer. The particular source of this load was traced to improper interfacing of the three locating pins on the dynamometer with the three holes in the flexible drive plate. The problem did not exist on engines equipped with flywheels for use with manual transmissions. In the relatively hurried and uncontrolled conditions of assembly line testing, the operators were not always establishing proper angular alignment of the pins with the pin-receiving holes in the flexible drive plate. With the pins and holes out of registry, tightening of the two clamping bolts resulted in the pins resiliently flexing the drive plate toward the engine. Thus, the axial deflection of the drive plate produced a large axially directed load on the pins, which load was transmitted through the entire adapter structure into the input shaft of the dynamometer, ultimately producing failure of the dynamometer.

A second source of dynamometer failures was traced to the nature of the engine configuration. A change in the firing program of the V-6 engine from one calling for firing of cylinders at three of the four 90 degree intervals of each revolution of the crankshaft to a program wherein a cylinder fired at every 120 degree interval of rotation produced three torque reversals per revolution of the crankshaft. It was discovered that torque peaks or spikes varying from +2000 foot-pounds to −1500 foot-pounds were occurring with this engine. Without a flywheel or torque converter to mask or partially absorb these severe torque reversals, the tested engines having flexible drive plates were producing torsional type of failures in the dynamometers.

Accordingly, the discovery of these two unexpected sources of extraordinary dynamometer loading led to the solution of the problems by the incorporation of two novel features in the dynamometer.

The problem produced by improper registry of the locating pins with the holes in the flexible drive plate was eliminated by the use of a thrust bearing mounted on the dynamometer input shaft in such a way that any axial loads directed toward the dynamometer were directed through such thrust bearing into the dynamometer housing, rather than onto the dynamometer input shaft.

The excessive torque reversal loading problem was overcome by the use of the torque absorber such as is normally used as part of the friction disc of a manual transmission clutch.

DETAILED DESCRIPTION OF THE DISCLOSURE

The present invention involves an improved adapter fixture 10 utilized for interfacing a water brake absorption dynamometer 12 with crankshaft 14 of an engine to be tested. The particular dynamometer utilized herein is a Model 556 water brake absorption dynamometer manufactured by Go-Power Corporation of Palo Alto, Calif., which dynamometer has been modified by applicant at its input end. It is to be understood, however, that the novel improvements made by applicants can also be applied to other models and types of dynamometers, and are not limited to use with the specific dynamometer or engine herein disclosed.

Figure 1:
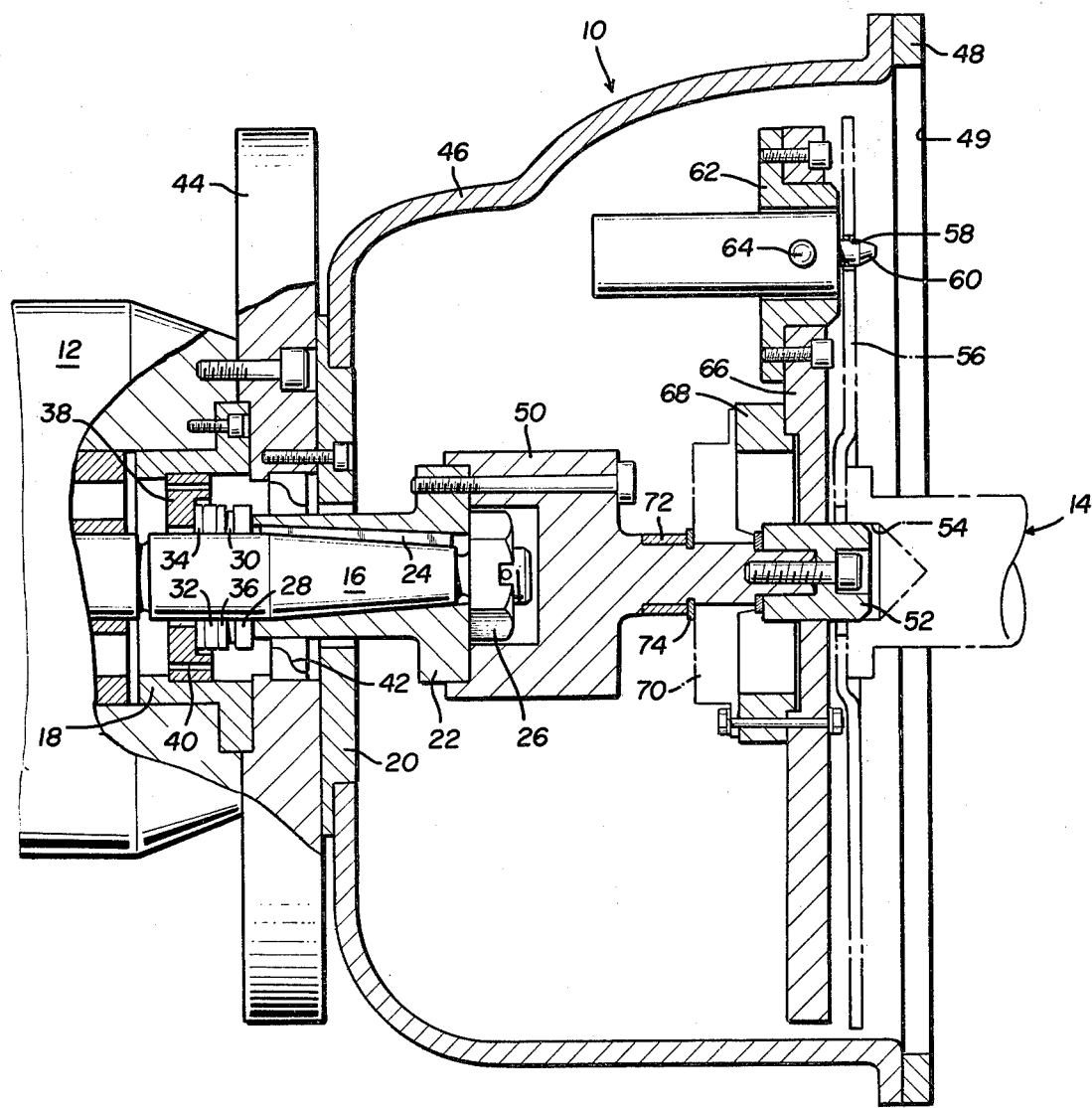
FIG. 1 is a fragmented side elevation, mostly in cross-section, showing the interconnection between the dynamometer and the engine, with the crankshaft and flexible drive plate of the engine being shown in phantom.

Standard portions of the dynamometer include input shaft 16, seal 18 and disc 20. A modified power input element in the form of flanged collar 22 transmits rotation of the engine into input shaft 16 by means of a standard key 24. As will be seen from FIG. 1, shaft 16 and collar 22 have cooperating tapers and are assembled together by means of a standard Castle nut 26.

As described above, one of the novel modifications of the input end of the dynamometer is the use of thrust absorbing means including thrust washer 28, shim 30 and a thrust bearing 32 including a stationary thrust race 34 and rotatable thrust race 36. Rotating race 36 abuts rotating thrust washer 28, while stationary race 34 abuts stationary thrust adapter 38 which in turn seats against a shoulder in seal 18. By way of example, the thrust bearing may be a Torrington model NTA-2233. As will be evident from FIG. 1, with proper selection of thickness of these elements, including shim 30, any axial loads applied from crankshaft 14 toward dynamometer 12 through flanged collar 22 will not be applied to dynamometer input shaft 16, but will instead be applied by the left end of collar 22 against thrust washer 28, and then through the thrust bearing into the dynamometer housing itself.

Lubrication for the thrust bearing 32 is provided from the dynamometer by means of oil passage 40 in thrust adapter 38, and an oil seal 42 is provided between collar 22 and dynamometer mounting plate 44.

The main portion of adapter fixture 10 is enclosed by bell housing 46 which is connectable through hardened wear plate 48 to rear face 49 of the engine block (shown in phantom).

Additional portions of the interfacing adapter 10 include shaft extension 50 bolted to flange collar 22 and terminating in a bolted-on shaft cap 52 which is dimensioned to be received in pilot hole 54 in the rear end of engine crankshaft 14. Cap 52 functions as a bearing, preferably with a radial clearance of about 0.001 inches, to eliminate any cantilever effect on the input end of the dynamometer and adapter assembly.

Flexible drive plate 56, shown in phantom, is bolted onto the flanged outer end of crankshaft 14, and is the standard flexible drive plate provided with engines intended to be used in combination with an automatic transmission. Drive plate 56 is provided with three angularly spaced holes 58 at 120 degree intervals, which holes normally cooperate with pins connected to the impeller of the torque converter portion of an automatic transmission to establish the driving connection between the engine and the transmission.

These same holes 58 are used for establishing a drive connection with dynamometer 12. Specifically, three drive or locating pins 60 (only one of which is shown) are each pivotally mounted in their respective pin mounting structure 62 by means of pivot pin 64. This pivoting arrangement, coupled with the relatively large and unbalancing mass located at the left end of pin structure 60, causes each of pins 60 to swing radially inward as the unbalanced left end swings radially outward under the influence of centrifugal force generated by rotation of this structure by crankshaft 14. The inward swinging of pins 60 causes the pins to pinch radially inward against the side wall of their associated hole 58 in drive plate 56, eliminating noise and providing a tight yet readily separable connection therebetween. It should be here noted that flexible drive plate 56 is shown in its normal position in FIG. 1, which position it maintains when pins 60 have been properly registered with holes 58 prior to bolting of dynamometer 12 and adapter fixture 10 to the engine.

Figure 2:
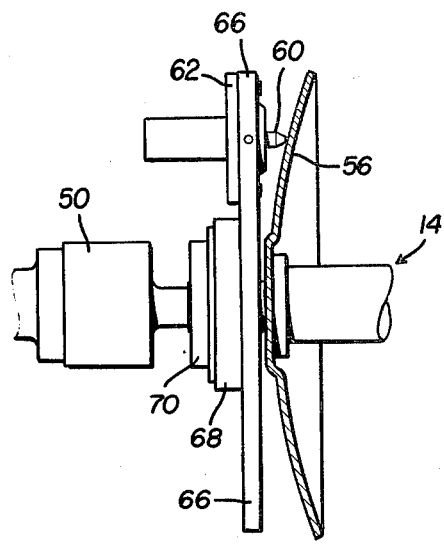
FIG. 2 is a fragmentary view, similar to FIG. 1, but showing only the locating pin and flexible drive plate portion of the interconnection when the pins and pin-receiving holes have been improperly aligned.

When the operator fails to first properly register pins 60 with holes 58 prior to tightening the bolts which temporarily secure the dynamometer to the engine, such tightening will cause pins 60 to deflect drive plate 58 toward the right, as shown in FIG. 2. It is this deflection which generates the substantial axial loads which caused the dynamometers to fail. However, the cause of such loading was not readily discoverable, because initial rotation of the improperly connected engine caused relative rotation between plate 56 and pins 60 until proper pin-hole registry was ultimately obtained.

Each of the three drive pin mounting assemblies 62 is bolted to drive plate 66, which is in turn assembled through annular spacer 68 to torque absorber assembly 70. Torque absorber 70 may, by way of example, be a modified manual transmission friction disc sub-assembly such as Model 102-10024 made by the Borg & Beck Division of Borg-Warner Corporation for General Motors. Applicant has modified such disc by adding mounting holes which permit the disc itself to be utilized as the power input element by means of the bolted connection to spacer 68. The disc is further modified to accommodate shim 72 which abuts the disc and spacer 74.

As is conventional with the type of torque absorber disclosed herein, the friction disc itself, here utilized as the friction input element of the torque absorber, is interconnected to a splined hub by means of a series of coil springs arranged with their axes parallel to the plane of the disc and extending in a tangential direction, one end of each spring effectively abutting the disc input element and the other end of each spring effectively abutting a radial flange-like extension of the splined hub output element. In the present application, the splined hub of torque absorber 70 is splined to shaft extension 50.

Thus, a resilient angularly yieldable connection is established between the input and output elements of the friction disc, permitting excessive torque pulses generated in the engine to be resiliently absorbed by compression of the coil springs, as is conventional in clutches of manual transmissions.

This invention may be further developed within the scope of the claims. Accordingly, the above specification is to be interpreted as illustrative of only a single operative embodiment of the present invention, rather than in a strictly limited sense.

I now claim:

1. In a dynamometer for testing the operation of an engine, the dynamometer having a non-rotating housing in which is rotatably mounted an input shaft adapted to be connected through adapter means to a rotating output element of the tested engine to be rotatably driven thereby, the improvement which comprises axial thrust absorbing means interposed between the adapter means and the dynamometer housing and so positioned and mounted so that any excessive axially-directed loads applied toward the dynamometer from the engine are transmitted through said thrust absorbing means directly into the dynamometer housing rather than onto the dynamometer input shaft.

2. The dynamometer of claim 1 wherein the input shaft is tapered and wherein the adapter means includes a collar having a tapered bore which receives the tapered input shaft, the input shaft and collar further being provided with torque transmitting means by which rotation of the collar is transmitted to the input shaft, but all axial loads applied by the collar toward the dynamometer are transmitted from the collar through the axial thrust absorbing means and not into the input shaft.

3. In a dynamometer for testing the operation of an engine, the dynamometer having a non-rotating housing in which is rotatably mounted an input shaft adapted to be connected through adapter means to a rotating output element of the tested engine to be rotatably driven thereby, the improvement wherein the dynamometer input shaft is tapered and the adapter means includes a collar having a tapered bore which rotatably drives the tapered portion of the input shaft through torque-transmitting means when the collar is driven by a tested engine, the torque transmitting means being incapable of transmitting into the input shaft axial loads directed toward the dynamometer, such axial loads being instead transmitted directly from the collar to the dynamometer housing by means of thrust bearing means mounted on the input shaft and abutting both the collar and the dynamometer housing.

4. In a dynamometer for testing the operation of an engine which has a flexible drive plate secured to its output shaft, the radially outer portions of the drive plate having a predetermined degree of resilient yieldability in a direction parallel to the axis of the output shaft and being provided with a plurality of circumferentially spaced holes for normally receiving projections on a rotatable input member of a transmission to establish a driving connection therebetween, the dynamometer having a non-rotating housing in which is rotatably mounted an input shaft including adapter means for establishing a driving connection from the flexible drive plate to the input shaft, the adapter means including driving pins dimensioned and positioned to enter the drive plate holes, the improvement which comprises:

the dynamometer input shaft having a tapered portion at its input end;

the adapter means including a collar having a tapered bore adapted to receive said tapered end of the input shaft, said bore and said tapered end of the input shaft being further provided with torque-transmitting means by which rotation of the collar as a result of rotation of the driving pins causes rotation of the input shaft, said torque-transmitting means being incapable of transmitting axial loads into the input shaft which are directed toward the dynamometer;

and thrust bearing means mounted on the input shaft between said collar and a portion of the dynamometer housing and abutting both said collar and said housing, whereby all axial loads directed toward the dynamometer from the tested engine are transmitted from said collar through said thrust bearing means to the dynamometer housing.

* * * * *